July 12, 1960 H. HEINZER 2,944,469
MACHINES FOR THE PRODUCTION OF BAGS CONSISTING AT LEAST
ON THEIR INSIDE OF THERMOPLASTIC MATERIAL
Filed Dec. 11, 1957 3 Sheets-Sheet 3
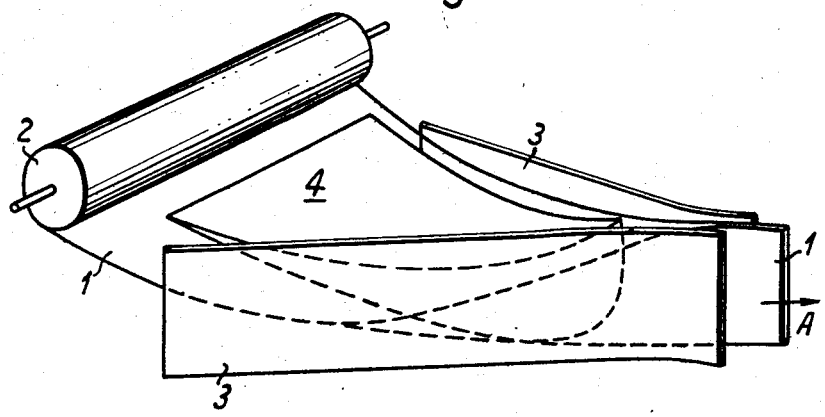
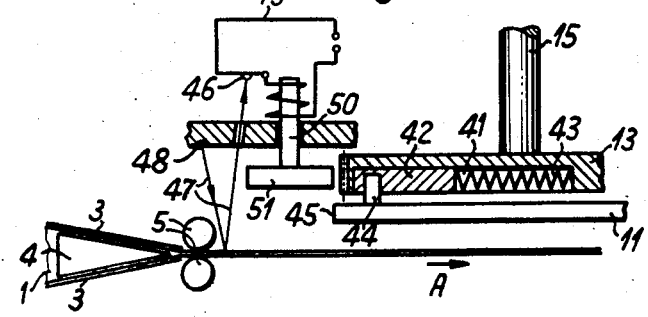

United States Patent Office 2,944,469
Patented July 12, 1960

2,944,469

MACHINES FOR THE PRODUCTION OF BAGS CONSISTING AT LEAST ON THEIR INSIDE OF THERMOPLASTIC MATERIAL

Hans Heinzer, Neuhausen am Rheinfall, Switzerland, assignor to Schweizerische Industrie-Gesellschaft, Neuhausen am Rheinfall, Switzerland Filed Dec. 11, 1957, Ser. No. 702,192

Claims priority, application Switzerland Dec. 21, 1956

4 Claims. (Cl. 93—8)

The present invention relates to a machine for the production of bags consisting at least on the inside of thermoplastic material.

It is an object of the present invention to provide a machine of the kind referred to which permits a substantial increase in production over the machines hitherto known in that the usual dead movements occurring in the usual machines are eliminated.

With this and other objects in view I provide a machine for the production of bags consisting at least on their inside of thermoplastic material, comprising in combination: a frame structure, a storage reel of strip material, a saddle surface member, a pair of guide rollers and a pair of feeder rollers arranged in succession in the direction of movement of the said strip material in the said structure, the said saddle surface member and guide rollers folding the said strip material upon itself in a plane perpendicular to the plane of the said strip material leaving the said storage reel, two carriages slidable parallel to the direction of movement of the said strip material on the said structure, a pair of clamping and heating jaws mounted reciprocably in opposite directions on each of the said carriages, and control means operatively connected to the said pairs of jaws in such a manner as to alternately open and close the same, one of the said pairs of jaws being open when the other one is closed and vice versa.

These and other features and objects of my present invention will be clearly understood from the following description of a preferred embodiment thereof, illustrated by way of example in the accompanying drawings, in which:

Fig. 3 is a detail in perspective view, and

Fig. 4 is a control device in a sectional plan view.

Figure 1:
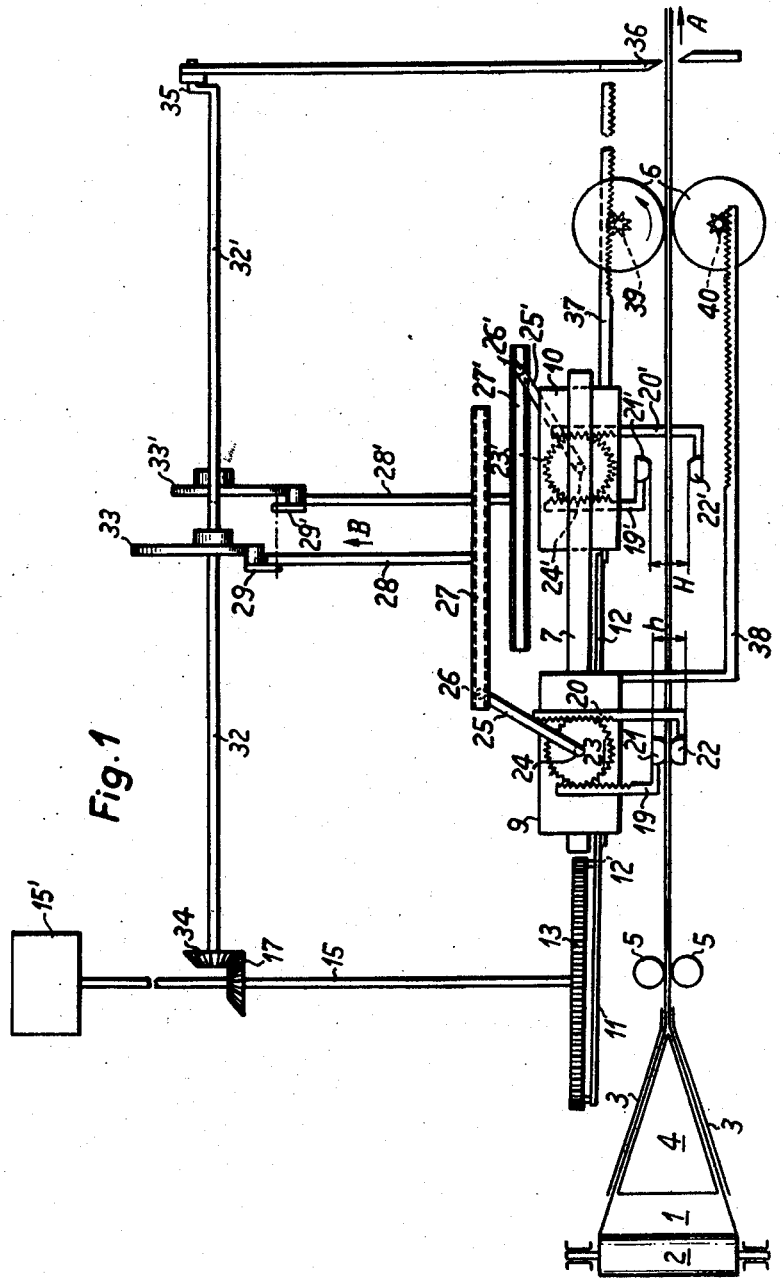
Fig. 1 shows a plan view of the machine.

In the drawing only the components required for the understanding of the invention have been illustrated. These components are of course accommodated in reality in a common casing which has been omitted from the drawing for clarity.

Figure 2:
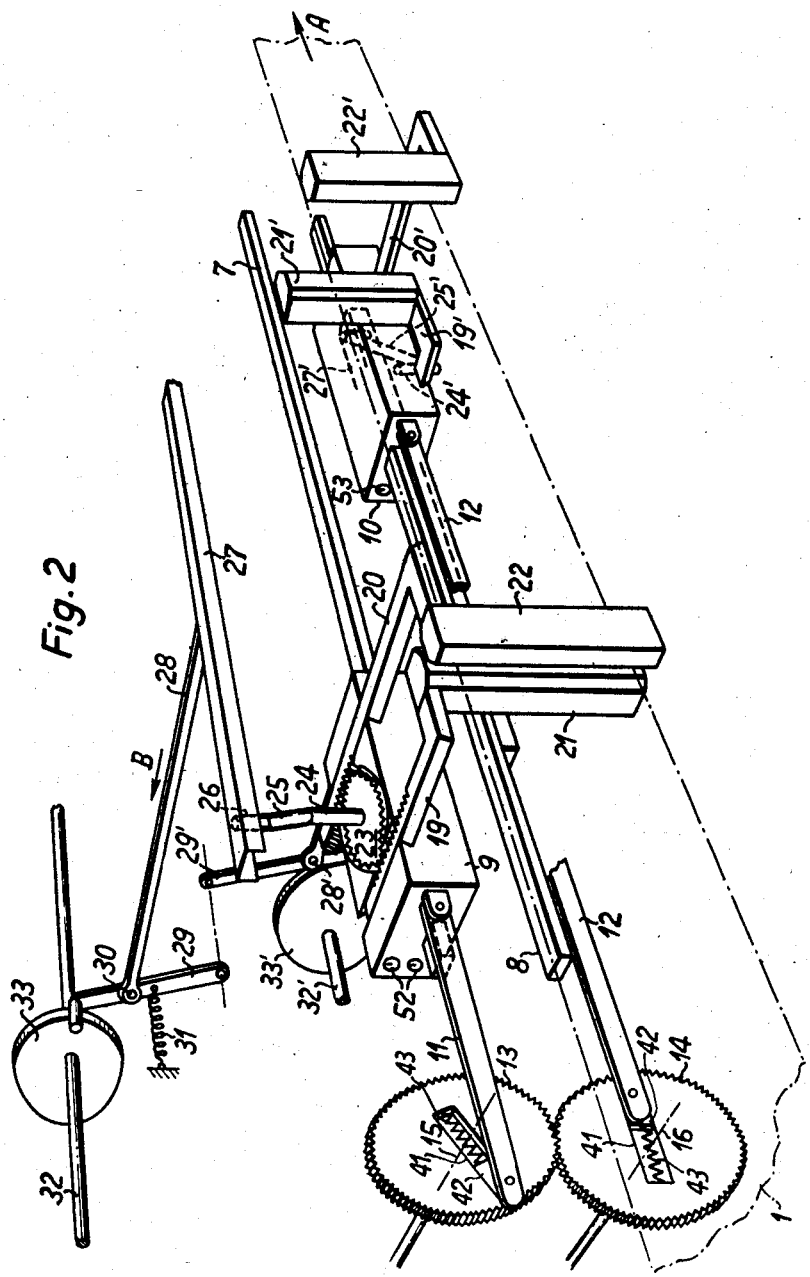
Fig. 2 is a partial perspective view thereof.

For the production of the bags a strip of material 1, having at least on the inside a thermoplastic coating, is drawn off from a storage reel 2. For the formation of the longitudinal fold forming the lower edge of the bag, this strip 1 is guided between two guides 3 and a so-called saddle surface member 4. Moreover it passes between two guide rollers 5 and two feeder rollers 6 (these rollers not being shown in Fig. 2).

Along the strip of material 1, between the pairs of rollers 5 and 6, two fixed bars 7 and 8 are arranged one above the other, on each of which a carriage 9 and 10, respectively is mounted slidably. These carriages 9, 10 are connected by means of rods 11 and 12, respectively. These rods 11, 12 are of equal length and only illustrated in the drawing as unequally long for reasons of illustration. The gears 13, 14 meshing with one another are mounted on shafts 15 and 16, respectively, each of these shafts carrying a bevel gear 17 and 18, respectively (the latter not being shown). The shaft 15 is coupled to a primary drive 15'. The manner of attachment of the rods 11, 12 to the gear wheels 13, 14 will be explained later in more detail with reference to Fig. 4.

The carriage 9 has two arms 19, 20 which are mounted slidably transversely of the direction A of movement of the strip of material 1 and each carries a clamping and heating jaw 21 and 22, respectively, which jaws are directed downwardly and are located in the same plane perpendicular to the strip of material 1. The arms 19, 20 are designed at one of their sides as toothed racks meshing with a gear wheel 23 mounted on the carriage 9, on which gear wheel an axle 24 is fixed which carries a horizontal lever arm 25 the end of which is provided with a slider block 26. This slider block 26 slides in a U-profile rail 27, which extends parallel to the bar 11 and can be reciprocated perpendicular to its longitudinal axis by a link 28. The link 28 is articulated to a rocker lever 29 at 30. The lever 29 is biased by a spring 31 towards a cam disc 33 mounted on a shaft 32. Instead of a cam disc obviously a slotted cam could be used in which case the spring 31 could be dispensed with. The shaft 32 carries at its left hand side end a bevel gear 34, which meshes with the bevel gear 17 of the shaft 15.

The carriage 10 is similarly constructed, corresponding elements being denoted by the same reference characters with a dash. The only difference consists in that the components 19', 20', 23' are arranged on the underside of the carriage 10 so that this rail 27' is open upwardly (Fig. 1). The shaft 32' is arranged underneath the shaft 32 and carries a bevel gear (not shown) meshing with the bevel gear 18 (likewise not shown) of the shaft 16.

The end of the shaft 32 is designed as a crank 35 and serves as a drive of a cutter device 36. The carriages 9, 10 moreover carry each a toothed rack 37 and 38, respectively, which toothed racks co-operate with freewheel drives 39 and 40, respectively, mounted on the axles of the rollers 6.

In Fig. 4 a special embodiment of the articulation of the rod 11 (or 12) on the gear wheel 13 (or 14, respectively) is illustrated. In the gear wheel 13 a groove 41 is provided, in which an insert body 42 is mounted slidably and biased outwardly by a spring 43. In this body 43 a pin 44 is mounted on which the rod 11 is articulated in such a manner that its end 45 slightly protrudes beyond the edge of the gear wheel 13.

For the control of the manner of operation of the machine a photo-electric cell 46 is provided which receives a light ray 47. This light ray 47 is reflected by a certain point of the strip of material or of an imprint of the bag to be produced serving as a reference point. A lamp 48 serves as a light-source. The photo-electric cell 46 is arranged in the circuit 49 of a solenoid 50 carrying an abutment 51 which co-operates with the end 45 of the rod 11 when the solenoid 50 is energised.

The clamping and heating jaws 21, 22 and 21', 22' are likewise connected to a source of current by means of conductors (not shown). In the carriages 9, 10 thermostats are built-in, which can be adjusted to the temperature desired by means of knobs 52, 53.

The machine illustrated functions as follows:

The strip of material 1 is placed by hand into the starting position, i.e. in the position of Fig. 1. The knobs 52, 53 are adjusted to the temperature desired for the material actually used. Thereafter the current supply circuit to the jaws 21, 22, 21' and 22' is closed.

Upon starting the machine the link 28 and the rail 27 are shifted in the direction of the arrow B by a corresponding rocking movement of the lever 29. Thereby the lever arm 25 is displaced in the counter-clockwise direction, which movement is transmitted by the gear wheel 23 to the arms 19, 20. The jaws 21, 22 clamp the folded strip along a vertical seam of the bag to be formed. The corresponding elements of the carriage 10 perform the inverse movement so that the jaws 21', 22' are apart (Figs. 1 and 2) namely in such a manner that their distance H is larger than the distance $h$ of the rear faces of the closed jaws 21, 22.

At the same time the gear wheels 13, 14 rotate. The rod 11 displaces the carriage 9 towards the right (Fig. 1), and the rod 12 displaces the carriage 10 towards the left. The toothed rack 37 effects through the free wheel clutch 39 the rotation of the rollers 6, while the toothed rack 38 slides over the disengaged free-wheel clutch 40. The jaws 21, 22 carry the strip 1 along and at the same time weld the desired seam. The bags previously welded on the strip 1 are severed from one another by the cutting device 36. At the end of their stroke the part played by the carriages 9, 10 is exchanged, and the operation described is repeated.

In practical embodiments the toothing ratios of the gear wheels 13, 14 and 17, 34; the number of teeth of the gear wheels 23, 23' and of the toothed racks 19, 20, 19', 20', 37, 38 as well as the form of the crank 35 are so selected that the synchronism desired for the various operations is made possible.

When an undesirable phase-offset of these operations occurs with respect to the imprint on the strip 1, the same is at once abolished automatically owing to the photo-electric cell 46.

The machine illustrated permits a substantial increase in production, since the usual dead movements of the clamping jaws are eliminated by the combination of two parts of such jaws.

While I have described herein and illustrated in the accompanying drawings what may be considered a typical and particularly useful embodiment of my said invention, I wish it to be understood that I do not limit myself to the details and dimensions described and illustrated, for obvious modifications will occur to a person skilled in the art.

What I claim as my invention and desire to secure by Letters Patent, is:

1. In a machine of the class described, a storage reel for a strip of thermoplastic material, means adjacent to said reel for folding said strip longitudinally, feeding means spaced from said folding means for advancing said strip from said reel, a pair of carriages, means supporting said carriages separately for sliding movement parallel to the path of said strip between said folding means and said feeding means, means associated with said carriages for reciprocating the same with one of said carriages always moving in the opposite direction to the other, a pair of clamping and heating jaws movably mounted on each of said carriages with one of said jaws of a pair at each side of said path of movement of the folded strip, a tooth rack secured to each of said jaws and extending transversely across its carriage with the toothed edges of the racks in each pair facing each other, a tooth wheel rotatably mounted on said carriage in meshing engagement with said pair of tooth racks, a projecting arm secured to said tooth wheel, guide means parallel with said carriage supporting means, means on the free end of said projecting arm slidably engaging said guide means, means operatively connected with said guide means for moving said guide means transversely, and means interconnecting said strip feeding means, carriage reciprocating means, and guide moving means in such a way as to close one of said pairs of jaws on the folded strip and actuate said feeding means at the beginning of a stroke of the carriage carrying said one pair of jaws while at the same time opening the other pair of jaws sufficiently wide to permit said closed pair of jaws to pass between them.

2. The machine as set forth in claim 1, in which each of said guide moving means includes a link pivotally secured to said guide means and extending transversely thereof, a pivotally mounted lever pivotally connected with said link at a point between the ends of said lever, a cam follower on the free end of said lever, cam means in operative engagement with said cam follower, and means operatively connecting said cam means with said carriage reciprocating means.

3. The machine as set forth in claim 2, in which each of said cam means is secured to a separate shaft parallel with said carriage supporting means, a connecting rod pivotally secured to each of said carriages, a pair of inter-engaging gear wheels rotatably mounted adjacent an end of said carriage supporting means and secured to axles extending perpendicularly to said carriage supporting means, means pivotally connecting each of said connecting rods to one of said gear wheels at a point spaced from the center thereof, and a pair of inter-engaging bevel gear wheels operatively connecting each of said axles to one of said shafts.

4. In a machine of the class described, a storage reel for a strip of thermoplastic material, means adjacent to said reel for folding said strip longitudinally, feeding means spaced from said folding means for advancing said strip from said reel, a pair of carriages, means supporting said carriages separately for sliding movement parallel to the path of said strip between said folding means and said feeding means, means associated with said carriages for reciprocating the same with one of said carriages always moving in the opposite direction to the other, a pair of clamping and heating jaws movably mounted on each of said carriages with one of said jaws of a pair at each side of said path of movement of the folded strip, a tooth rack secured to each of said jaws and extending transversely across its carriage with the toothed edges of the racks in each pair facing each other, a tooth wheel rotatably mounted on said carriage in meshing engagement with said pair of tooth racks, a projecting arm secured to said tooth wheel, guide means parallel with said carriage supporting means, means on the free end of said projecting arm slidably engaging said guide means, a link pivotally secured to each of said guide means and extending transversely thereof, a pivotally mounted lever pivotally connected with said link at a point between the ends of said lever, a cam follower on the free end of said lever, cam means in operative engagement with said cam follower, a shaft carrying said cam means and extending parallel with said carriage supporting means, a connecting rod pivotally secured to each of said carriages, a pair of inter-engaging gear wheels rotatably mounted adjacent an end of said carriage supporting means and secured to axles extending perpendicularly to said carriage supporting means, a block slidably mounted in each of said gear wheels for movement substantially radially thereof, spring means urging said block in one direction, means pivotally connecting each of said connecting rods with one of said blocks, and a pair of inter-engaging bevel gear wheels operatively connecting each of said axles to one of said shafts.

References Cited in the file of this patent

UNITED STATES PATENTS

| 2,326,931 | Dalton et al. | Aug. 17, 1943 |
| 2,741,079 | Rausing | Apr. 10, 1956 |

FOREIGN PATENTS

| 151,172 | Australia | Apr. 29, 1953 |